Inventors:
Heinz Leiber
Heinz Wehde
Dietrich Brunner

BY Spencer & Kaye
ATTORNEYS 3,521,854
ELECTROMAGNETICALLY ACTUATED VALVE WITH A PLUNGER-TYPE ARMATURE ARRANGEMENT
Heinz Leiber, Leimen, Heinz Wehde, Heidelberg, and Dietrich Brunner, Edingen, Germany, assignors to Teldix Gesellschaft mit beschrankter Haftung, Heidelberg, Germany
Filed Nov. 3, 1967, Ser. No. 680,365
Claims priority, application Germany, Nov. 8, 1966, T 32,498
Int. Cl. F16k 31/06
U.S. Cl. 251—129   17 Claims

ABSTRACT OF THE DISCLOSURE

An electromagnetically actuated valve having a lightweight plunger-type armature. The armature which has one cylindrical surface and one substantially planar surface for the transition of magnetic flux therethrough is shaped as an annulus. The valve element is arranged in the open center of the armature and is held there in position by a number of arms extending radially outward from the valve element to the armature.

BACKGROUND OF THE INVENTION

The present invention relates to an electromagnetically actuated valve, the magnetic circuit of which includes both a cylindrical airgap (radial gap), the area of which remains practically unchanged during the armature stroke, and a substantially planer working airgap (axial gap), for entrance and exit of the magnetic flux to and from the armature.

Electromagnetically actuated valves of the type to which this invention relates have what is known as a "plunger-type" armature system. Such a system is distinguished from the plate-type armature system which has two, usually planar, armature stroke variable airgaps through which the flux enters and leaves the armature. Airgaps having a stepped profile or a flat arched cross section are included here in the meaning of "planar airgap" so long as the direction of motion of the armature is approximately normal to the gap surfaces.

The plunger type armatures used in the valves of the prior art have the shape, more or less, of a solid cylinder, the height of which is equal to or greater than the diameter. These armatures often simultaneously serve as the valve closing element, and, if so, are provided with sealing surfaces or separately inserted gaskets to improve the seal. It is also known to provide these armatures with longitudinal holes or with grooves on their circumferential surfaces making an orifice, in the case of three-way valves, through which the pressure medium may pass. The face surface of these armatures has also been recessed to receive the position restoring or biasing coil spring. In all of these cases, the iron mass of the armatures has been large relative to that portion through which the useful magnetic flux has actually passed; that is, that portion that has contributed to the armature actuating force.

SUMMARY OF THE INVENTION

An object of the present invention is to design a solenoid valve having an especially short actuating time; that is, an actuating time that lies in the order of the magnitude of one millisecond.

This and other objects which will become apparent in the discussion that follows are achieved, according to the present invention, by measures which reduce the mass of the moving member of the valve in relation to the electrical power applied to the valve.

It is proposed that the armature of the valve, according to the present invention, be constructed in annular form and have a valve closing element mounted within it by means of radially running arms or ribs. This arrangement results in an unusually flat armature for this type of magnet system, the iron parts being exclusively employed for the conduction of the magnetic flux. In the area internal to the armature, which would otherwise be scarcely permeated by magnetic flux, the use of iron is unnecessary; it is here, therefore, that the valve closing element is arranged and constructed so as to minimize the weight of the moving member of the valve.

It is further proposed that the several arms or ribs that connect the valve closing element with the armature be joined together into a single solid member which shall, hereinbelow, be called the "connecting member." The arms or ribs, or, if they are joined, the entire connecting member, are preferably made of a material which is substantially lighter than the iron used for the armature. The connecting member can take the form, for example, of a hub having radially extending arms, the ends of which are pressed into, glued onto, cast onto or otherwise connected to the armature. The joint between the valve closing element and the connecting member can be similarly arranged.

To insure that the valve closing element properly seats itself it is advantageous, however, that the form-locking connection be made in the direction of stroke movement only so that the connecting member may rotate and/or move radially within the armature or that the valve element may rotate and/or move radially within the connecting member.

It is well known that care must be taken, with the plunger-type armature magnetic system, to insure that the armature be guided in such a way that it may move without friction; that is, without contact with the stationary parts of the magnetic system. This elimination of friction, which is necessary to achieve the highest performance for a given power input, is accomplished, according to a particular embodiment of the present invention, by fixing the armature between two flat springs arranged parallel to each other and transverse to the direction of the armature stroke. These flat springs are ring-shaped and have internal openings or arms which increase their flexibility in the stroke direction without substantially decreasing their rigidity in the direction transverse to the stroke direction. The flat springs are thus designed only to guide the armature, and prevent its movement in the radial direction. A third coil spring, which preferably abuts the outer edge of the armature, provides the force to return and hold the armature at its initial position in the absence of a magnetic field.

Special production advantages accrue if the armature is surrounded by a guide member which, together with the flat springs and the entire moving member of the valve, can be inserted in the valve housing as an integral and exchangeable unit of construction. With such an arrangement, the valve housing may be designed to be closed with only a single threaded connection or even closed by means of a jointed-flanged connection with threaded connections altogether eliminated.

Regarding now the relation between the height and outer diameter dimensions of the annular armature, the present invention starts with the consideration that the magnetic flux should should enter and leave the armature through surfaces having approximately the same area. With the condition that the cylindrical surface area of a solid cylinder equal the surface area of one end, it is easily shown that the solid cylinder must have a ratio between height and diameter of 1:4. Such a condition, if imposed on a ring or annulus, would clearly make it even flatter than the solid cylinder.

There is though, a practical limitation on the flatness of the annular armature of a valve if it is necessary that the armature be constrained to move only in the axial direction. Even the ratio of 1:4 between the height and the outer diameter need hardly be approached with an annular armature, however, to achieve better results than have been obtained with the solid armature valves of the prior art. Nevertheless, it is best to arrange that in valves having an annular armature in accord with the present invention, the axial height of the cylindrical surface which serves as a transition surface for magnetic flux be less than the outer diameter of the flux transition end surface.

DESCRIPTION OF THE PREFERRED EMBODIMENTS

Figure 1:
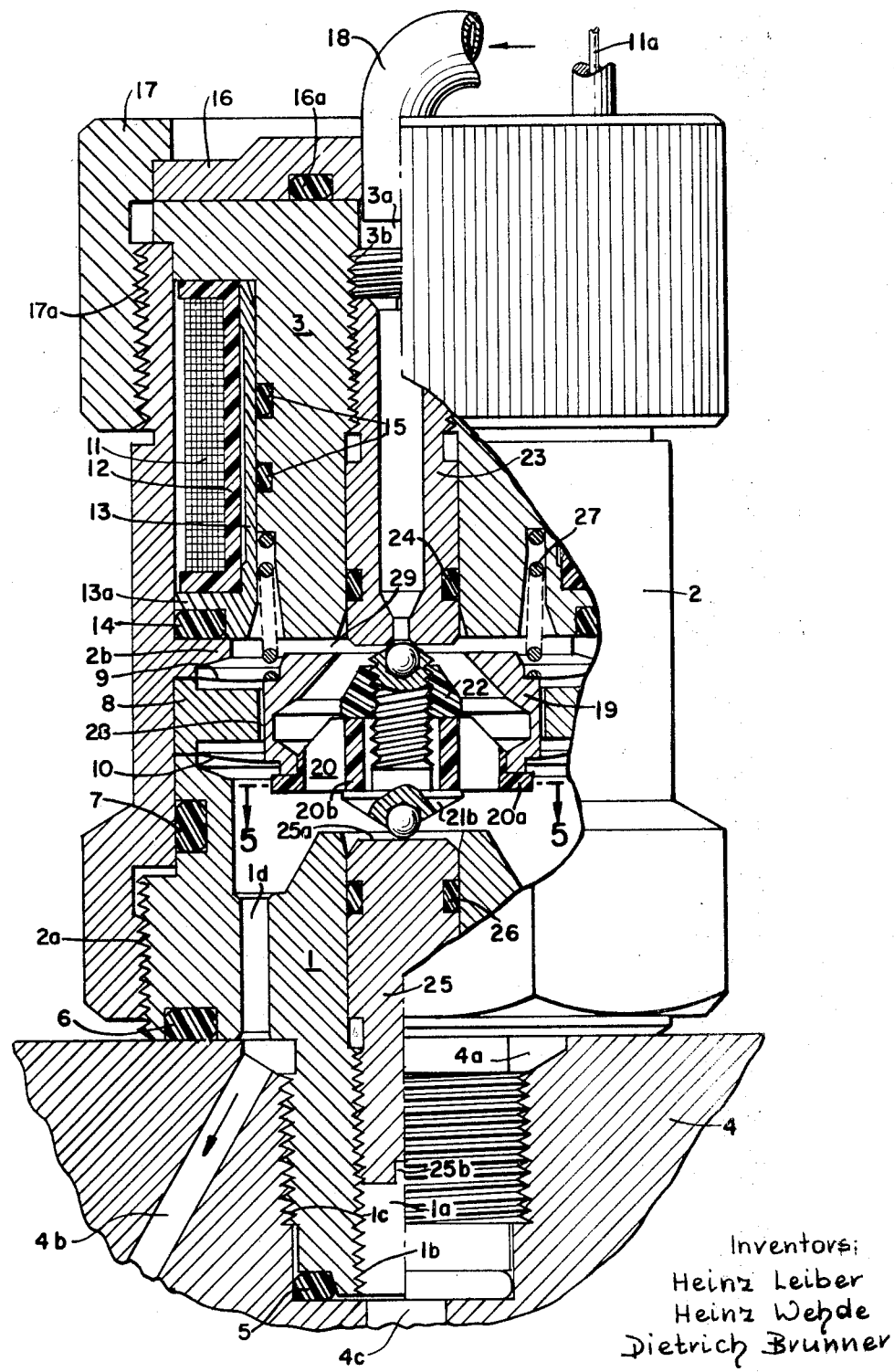
FIG. 1 is an elevational view, in partial cross section, of one embodiment of a solenoid valve according to the present invention enlarged four times actual size.

Turning now to the drawings, and to FIG. 1 in particular, the preferred embodiments of the present invention will now be described. The major components of the solenoid valve illustrated in FIG. 1 comprise a base 1, a housing 2 and a pole member 3. The base 1 has a hole 1a passing through its center which is provided with an internal thread 1b for a portion of its length. The elongated part of the base extending downward is provided with an external thread 1c by which the base can be screw-fastened into a support 4. The broader upper part of the base which is held tight against the support 4 by the screw connection squeezes a sealing ring 6 (a so-called O-ring) made of a suitable elastic material. Another sealing 5 of smaller diameter is also provided at the face of the lower end of the base.

The housing 2 is screwed onto the base by means of an internal thread 2a and sealed with an O-ring 7. As the housing is screwed down over the base, a spacer ring 8 and two circular flat springs 9 and 10 arranged on both sides of the spacer are squeezed between an internal flange 2b of the housing and the upper face surface of the base. These flat springs will be discussed again in greater detail below.

The magnetic winding 11, a concentric ring coil which is cast together with a plastic coil form 12, is located in the upper part of the housing 2. The winding connector lead 11a is passed out through the top of the valve. The coil form, including the winding, is inserted from the top in a space between a sleeve 13 made of non-magnetic material and the housing wall. The sleeve supports itself at its lower end with a flange 13a which abuts the housing wall and is sealed with the aid of O-rings 14 and 15 against the housing and the pole member 3, respectively. The sleeve serves to insulate the magnet winding in a pressure-free region so that the winding is protected from the mechanical stresses of the pressure or fluid medium.

The pole member 3 has a hole 3a through its center, as does the base 1, with an internal thread 3b in its upper portion. The pole member projects from above into the housing and the sleeve 13. The upper flange or wider part of the pole member 3 is adapted to the wall and upper end of the housing. A cover 16 which sits on top of the pole member is held in place by means of a knurled cap screw 17, with thread 17a, which is screwed down over the housing. The cover, therefore, presses the pole member into the housing as far as it will go, secures the winding and the sleeve against axial displacement, and provides, simultaneously, the sealing pressure for the O-ring 14. A connecting pipe 18 is soldered into the cover and opens into the central hole 3a. An O-ring 16a seals the cover against the pole member 3.

A ring-shaped armature 19 moves up and down in the space between the pole member and the base. The cylindrical outside surface of the armature is designed to form a very narrow cylindrical airgap 28 with the inside surface of the spacer ring 8. The flat springs 9 and 10 guide the movement of the armature in the axial direction so exactly that there is no friction contact with the spacer ring 8. To this end the flat springs lie with their inner edges in shoulders of the armature 19 which have been made to within a very narrow range of tolerances.

Figure 3:
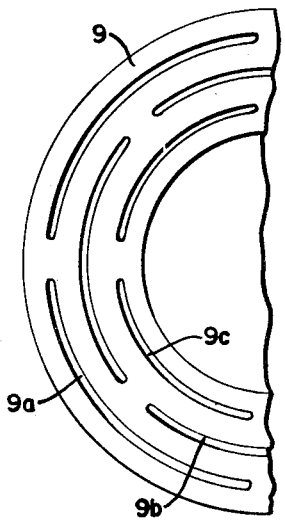
FIG. 3 is a top view of one embodiment of one of the flat springs employed in the valve shown in FIG. 1.

FIG. 3 illustrates in top view one-half of one such flat spring. The spring is manufactured as a ring-shaped plate out of very thin spring material. It is provided with three concentric rings 9a, 9b and 9c, each ring comprising four bow-shaped slits. The slits in the middle ring 9b are displaced with respect to the slits of the outer and inner rings by 45 degrees. The inner edge of the resulting form can, therefore, easily move axially with respect to the outer edge but, at the same time, is very rigid with respect to radial movement.

Figure 4:
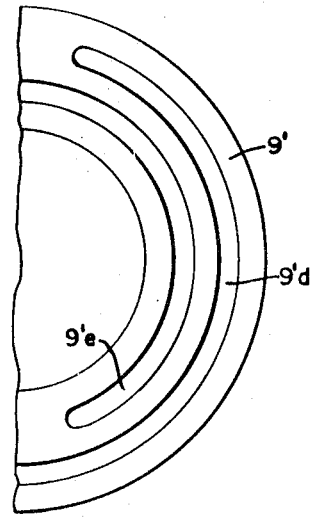
FIG. 4 is a top view of another embodiment of a flat spring of the type shown in FIG. 3.

FIG. 4 shows a second embodiment of such a spring which can be selectively used in place of the spring shown in FIG. 3. This flat spring 9' is provided with only two concentric slits 9'd and 9'e, each of which extend over an arc of approximately 330° and are displaced with respect to each other by 180°. This configuration leaves an internal ring and an external ring connected with each other by two semicircular shaped spring arms. The local bending stress of the spring material is thus reduced through this embodiment.

Figure 5:
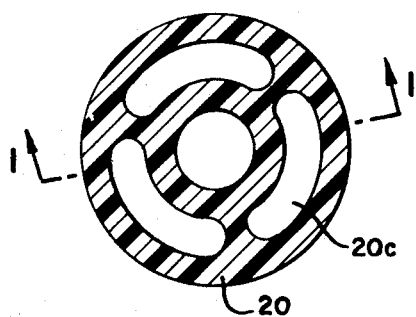
FIG. 5 is a cross section through a connecting member used in the valve shown in FIG. 1.
Figure 6:
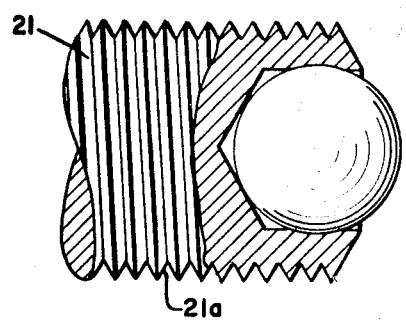
FIG. 6 is an exploded view, partially in cross section, of one end of the valve closing element employed in the valve shown in FIG. 1.

A connecting member 20 made of synthetic material is inserted and glued into the armature 19 from below. A cross section taken through this member is shown in FIG. 5. The connecting member is comprised of an outer flange 20a and an iner hub 20b which are joined together by three radially running ribs. This configuration thus leaves three kidney-shaped openings 20c as shown in FIG. 5. A metal closing element 21 is held laterally movable in the hub 20b. The closing member comprises a shaft and a flat head 21b. The shaft, the end of which is shown, further enlarged, in FIG. 6, is provided with threads 21a. The outer diameter of the shaft is considerably smaller than the inner diameter of the hub. The flat head, which is larger than the inner diameter of the hub, is placed from below against the face side of the hub while from above a nut 22 made of synthetic material is screwed down. This nut holds the closing member in place but is loose enough to permit lateral movement thereof. An upper and a lower steel ball, not designated with element numbers, each serve as the actual sealing member, or, if desired, the limit stop contact. These balls are tightly pressed into holes located at the center of both ends of the closing member to a depth slightly greater than their radius. The inner walls of the holes are deformed in the process so that they cling to the ball. To insure that the balls remain in place it is also possible to lightly flange over the rims of the holes onto the balls.

A component 23 is screwed into the thread 3b of the pole member and serves both as a valve seat and to limit the upward movement of the armature. This component 23 is separately illustrated, upside down, in FIG. 2. The component 23 is provided with a hole 23a through its center and an O-ring groove 23b. The corresponding O-ring 24 seals this component against the pole member 3 without impairing the ability of the component 23 to move in the longitudinal direction. A screw driver slot 23c is provided at one end of the component 23 to facilitate adjustment in the longitudinal direction. The central hole through this component narrows at the other end and then opens into a cone. This cone is the valve seat 23d against which the respective ball is pressed.

A component 25 limits the downward stroke movement of the armature. The outer dimensions of this component are similar to that of component 23; it is, however, not provided with a hole through the center. The upper face 25a of this component 25 is a flat case hardened surface upon which the lower ball of the closing element can impinge. A screwdriver slot 25b provides easy adjustability for this component 2; an O-ring 26 provides a seal between this component and the base 1.

The solenoid valve illustrated in FIG. 1 works as a one-way closing valve. When the magnet winding is not excited, a coil spring presses the armature, including the closing member, downward so that the lower ball is in contact with the face 25a of the limit stop component 25 and the upper ball clears the valve seat 23d. One end of the coil spring 27 presses against the inner edge of the flat spring 9 holding this flat spring against the armature. The other end of the coil spring 27 is propped against a shoulder of the pole member 3. When the armature and pole member are in this position the pressure medium can enter the inlet pipe 18 and pass through the hole 3a and 23a, the valve seat, the armature and the opening 20c of the connecting member to an eccentric longitudinal hole 1d in the base. The hole 1d opens into an annular canal 4a recessed in the support 1 which is provided with a slanting hole 4b that serves as an outlet for the pressure medium. When the winding is excited the armature moves upward against the force of the coil spring 27 pressing the upper ball into the valve seat.

If the two components 23 and 25 are exchanged, the valve becomes an opening valve. In this case the inlet pipe 18 remains unused. The pressure medium is introduced through the slanting hole 4b and leaves the valve through the hole 1a in the center of the base. This hole 1a extends into a hole 4c in the support 4.

Figure 2:
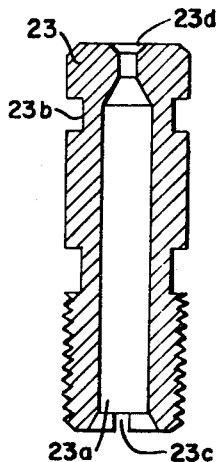
FIG. 2 is a cross-sectional view of the valve seat element used in the valve shown in FIG. 1.

If now, the limit stop component 25 is exchanged for a valve seat component as illustrated in FIG. 2, and the upper valve seat component, as shown in FIG. 1, is left in, the solenoid valve turns into a three-way valve. Both balls can now operate as sealing members.

If the valve is screwed out and the cover removed, both screwdriver slots become accessible. The dropout time of the valve may first be set by adjusting the upper component since the dropout time is determined by the residual airgap 29 between the pole member and the armature when the magnet winding is excited. This residual or working airgap can, for example, be set equal to 0.05 mm. The operating time of the valve, which depends on the stroke of the armature (for example, 0.3 mm.) can then be adjusted by means of the ring 8 which determines that part of the vertical cylindrical lower component. After both actuating valves are brought to within the desired tolerances, both components can be fixed, in addition, with one drop each of a hardened sizing.

The form of the armature, the connecting member and the closing member of the valve according to the present invention results in an unusually small weight for these movable parts. The cross section of the armature is very thin in its lower portion but increases sharply in the upper direction so that the surface of the upper face approximately equals the inner cylindrical surface of the spacer cal surface of the armature that serves to pass the magnetic flux.

The magnetic flux runs from the elongated portion of the pole member 3 through the upper flange of the pole member 3 to the housing. The flux then enters the spacer ring 8, which is flush against the housing, passes through the cylindrical airgap 28 to the armature, and returns through the working gap 29 to the pole member. The cross-sectional form of the armature is proportioned so as to conform with the curve of the magnetic flux in its return path.

The point contact of the lower ball with the limit stop component eliminates any suction effect when the closing member is raised. This configuration thus serves to reduce the operating time of the valve.

Figure 7:
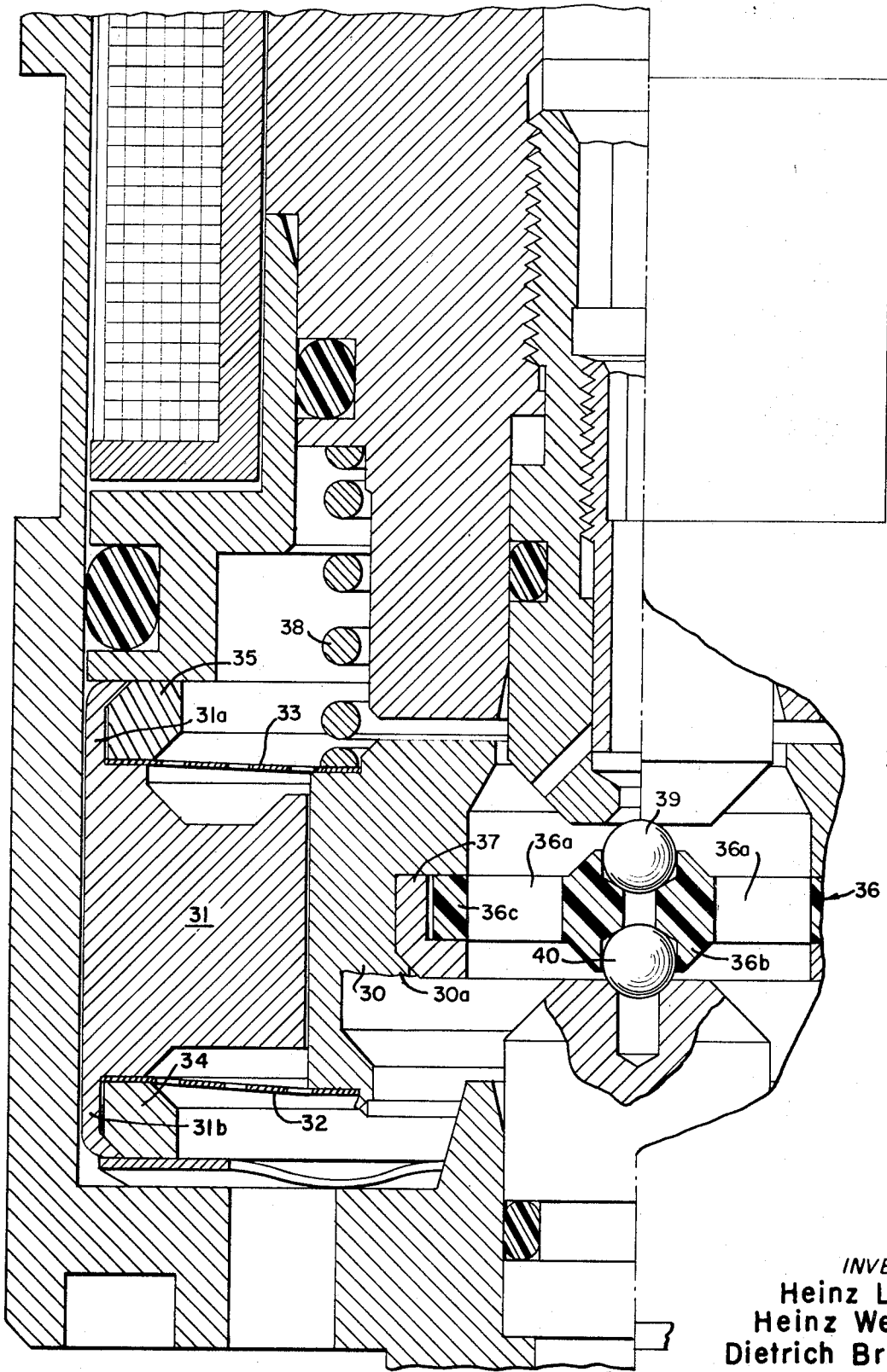
FIG. 7 is an elevational view, in partial cross section, of a portion of another embodiment of the solenoid valve according to the present invention enlarged ten times actual size.

A simplified embodiment of the present invention, which is easier to manufacture, is illustrated in FIG. 7. The part which corresponds to the spacer ring 8 in FIG. 1 is designated here as guide member 31. An annular armature 30 is connected with the guide member by two flat springs 32 and 33 which correspond to those springs shown in FIG. 3. It is advantageous in this embodiment to increase the distance between the flat springs from the distance shown in the valve embodiment of FIG. 1. This is accomplished without a considerable increase in the mass of the annular armature 30 by increasing the axial height of both the guide member 31 and the armature.

The guide member 31 has upwardly and downwardly projecting cartridge-like extensions 31a and 31b. During preassembly of the solenoid valve the flat springs are laid against these extensions and held tightly by two pressure rings 34 and 35. These pressure rings are provided with beveled edges over which the ends of the cartridge-like extensions may be flanged, thus tightly securing the flat spring to the guide member 31. The insides of the flat springs surround and hold the armature between them. The result is an integral and exchangable assembly which, with the exception of the coil spring 38, includes the entire moveable system of the valve. This assembly can be inserted as a unit into a simplified valve housing without the use of screw threads.

The valve closing element shown in FIG. 7 is also different from the valve element shown in FIG. 1. The connecting member and the valve element have been partly joined to form one piece and are designated together with the number 36. This part takes the shape of a round wafer in the center of which are pressed the flanged hard balls 39 and 40 that serve as sealing members. The center is surrounded by holes 36a arranged in a circle between which run radially extending arms. The edge region 36c of the wafer 36 is held to the armature by a fastening ring 37. This ring fits flush into the armature and is fastened there by another flange connection 30a. The wafer 36 is given sufficient freedom to turn between the collaring edge of the ring 37 and the armature, and, above all, to move to a certain extent in the lateral direction.

It will be understood that the above description of the present invention is susceptible to various modifications, changes and adaptations, and the same are intended to be comprehended within the meaning and range of equivalents of the appended claims.

We claim:

1. In a magnetically actuated valve, the improvement comprising, in combination:
   (a) an annular armature having one surface for the transition of magnetic flux into said armature, and one surface for the transition of magnetic flux out of said armature, one of said surfaces being cylindrical and the other of said surfaces being substantially planar;
   (b) valve means arranged within said armature including a valve element which is held in position by means of arms extending radially from said element to said armature; and (c) a stator structure of magnetizable material having one surface opposite said cylindrical surface, and one surface opposite said planar surface and means for creating a magnetic flux passing through said armature from one to the other of said stator surfaces.

2. The improvement defined in claim 1, wherein said arms are all a part of a single component which connects said valve element with said armature.

3. The improvement defined in claim 1, wherein said arms are made of a material which is substantially lighter than iron.

4. The improvement defined in claim 2, wherein said component is made of a material which is substantially lighter than iron.

5. The improvement defined in claim 2, wherein said component includes a hub and wherein said arms extend radially away from said hub and are connected with said armature.

6. The improvement defined in claim 2, wherein said valve element is mounted in said component such that said element is movable in the radial direction within said component.

7. The improvement defined in claim 2, wherein said valve element is mounted in said component such that said element is rotatable within said component.

8. In a magnetically actuated valve, the improvement comprising, in combination:
(a) an annular armature having one surface for the transition of magnetic flux into said armature, and one surface for the transition of magnetic flux out of said armature, one of said surfaces being cylindrical and the other of said surfaces being substantially planar;
(b) valve means arranged within said armature including a valve element which is held in position by means of arms extending radially from said element to said armature, and wherein said arms are all a part of a single component which connects said valve element with said armature, and wherein said component is mounted in said armature such that said component is movable in the radial direction within said armature.

9. In a magnetically actuated valve, the improvement comprising, in combination:
(a) an annular armature having one surface for the transition of magnetic flux into said armature, and one surface for the transition of magnetic flux out of said armature, one of said surfaces being cylindrical and the other of said surfaces being substantially planar;
(b) valve means arranged within said armature including a valve element which is held in position by means of arms extending radially from said element to said armature, and wherein said arms are all a part of a single component which connects said valve element with said armature, and wherein said component is mounted in said armature such that said component is rotatable within said armature.

10. In a magnetically actuated valve, the improvement comprising, in combination:
(a) an annular armature having one surface for the transition of magnetic flux into said armature, and one surface for the transition of magnetic flux out of said armature, one of said surfaces being cylindrical and the other of said surfaces being substantially planar;
(b) valve means arranged within said armature including a valve element which is held in position by means of arms extending radially from said element to said armature, and wherein said arms are all a part of a single component which connects said valve element with said armature, and wherein said armature is rectilinearly movable between two positions in a direction parallel to the axis of said cylindrical surface, and said improvement further comprises:
(c) two flat spring means arranged parallel to each other and transverse to said axis for guiding the movement of said armature; and
(d) coil spring means for biasing said armature toward one of said two positions.

11. The improvement defined in claim 10, further comprising:
(a) a valve housing; and
(b) an armature guide member inserted in said housing and surrounding said armature and wherein said guide member, said flat springs and said armature form an exchangable integral unit of constructions.

12. The improvement defined in claim 1, wherein the axial length of said cylindrical surface is less than the outer diameter of said substantially plane surface.

13. The improvement defined in claim 1 wherein said planar face of the armature has an area which is larger than the surface area of said armature at the end which is opposite to said planar surface.

14. The improvement defined in claim 1 wherein said means for creating a magnetic circuit includes a current-carrying coil positioned about a portion of said stator, said coil having an inner diameter which is greater than said armature.

15. The improvement defined in claim 1 wherein the axial length of said armature cylindrical surface is less than the outer diameter of said armature substantially plane surface, wherein said planar surface of the armature is larger than the surface area of said armature at the end opposite said planar surface and wherein said means for creating a magnetic flux includes a current-carrying coil having an inner diameter which is greater than the outer diameter of said cylindrical surface of the armature.

16. The improvement defined in claim 1 including means for creating an air gap between said planar armature surface and said opposite stator surface, and means for adjusting the length of said air gap, and means creating a cylindrical air gap between said armature cylindrical surface and said opposite stator surface.

17. The improvement defined in claim 1 wherein said planar face of the armature has dimensions substantially similar to those of the face of said stator which is opposite it, and the end of said armature which is most remote from said opposite stator face has a smaller area than said armature planar face whereby the mass and movement resistance of said armature is reduced without substantial effect on the magnetic forces acting upon it.

References Cited

UNITED STATES PATENTS

| | | | |
|---|---|---|---|
| 1,342,641 | 6/1920 | Moreton | 251—139 |
| 2,536,813 | 1/1951 | Jones et al. | 251—139 X |
| 3,107,893 | 10/1963 | Bashe | 251—129 X |
| 3,218,022 | 11/1965 | Lewis | 251—141 X |
| 3,383,084 | 5/1968 | Mayfield | 251—139 X |

ARNOLD ROSENTHAL, Primary Examiner

U. S. Cl. X.R.

251—141